Feb. 3, 1953 W. J. KEAR 2,627,210
CLAMPING DEVICE
Filed June 22, 1951 2 SHEETS—SHEET 1
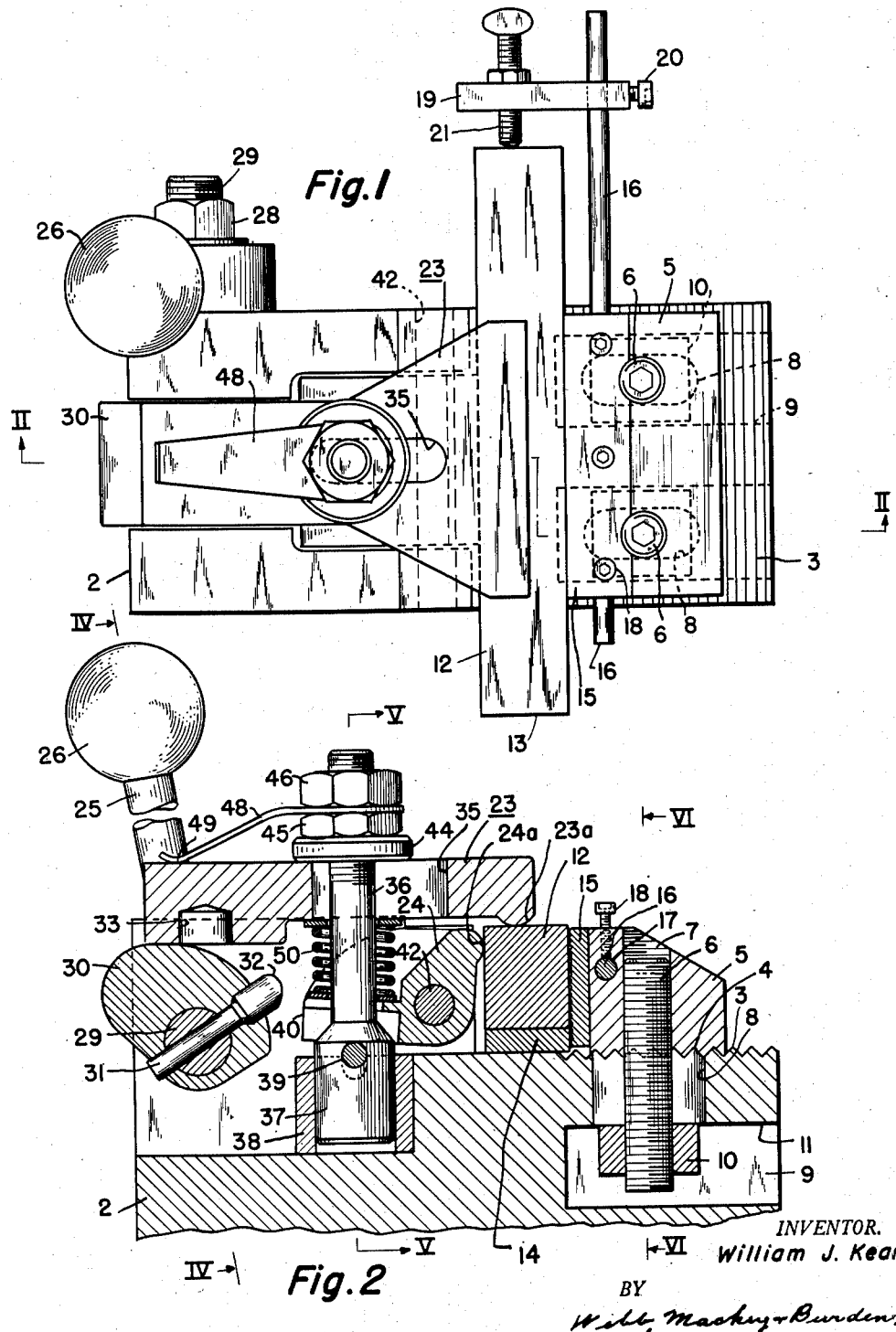
INVENTOR.
William J. Kear
BY
Bill, Mackey + Burden.
HIS ATTORNEYS Feb. 3, 1953 W. J. KEAR 2,627,210
CLAMPING DEVICE
Filed June 22, 1951 2 SHEETS—SHEET 2
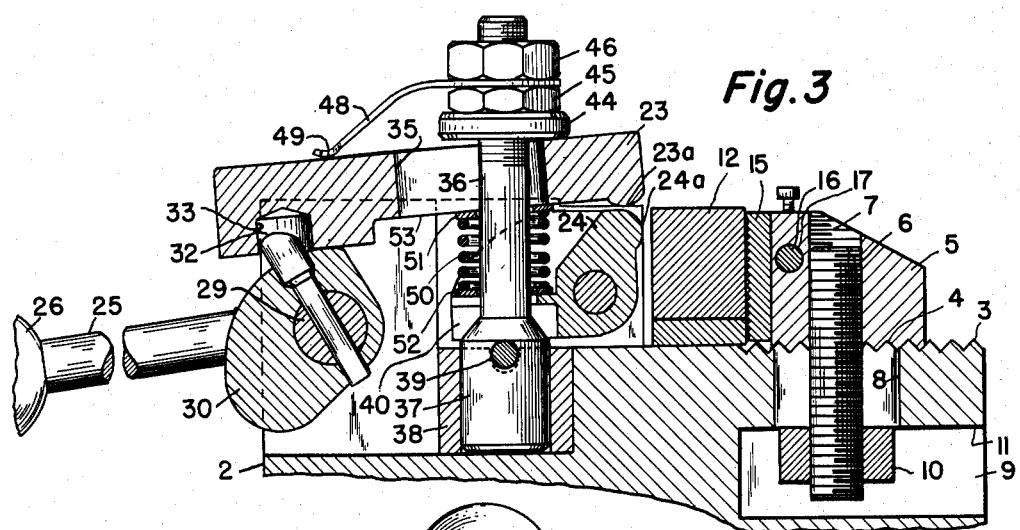
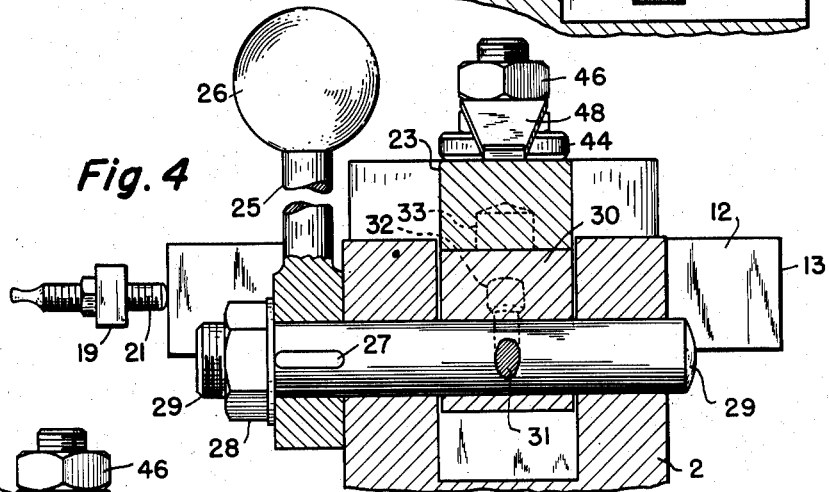
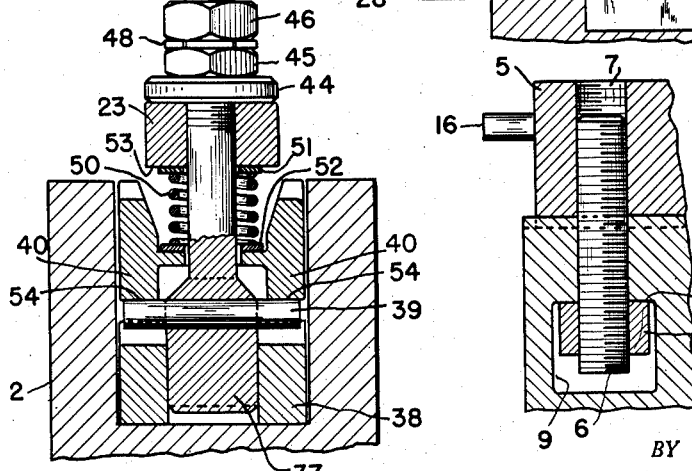
INVENTOR.
William J. Kear
BY
HIS ATTORNEYS Patented Feb. 3, 1953

2,627,210

UNITED STATES PATENT OFFICE 2,627,210

CLAMPING DEVICE

William J. Kear, McKeesport, Pa., assignor to Firth Sterling Steel & Carbide Corporation, McKeesport, Pa., a corporation of Pennsylvania Application June 22, 1951, Serial No. 233,037

7 Claims. (Cl. 90—59)

This invention relates to a clamping device for holding a work piece in position so that the end of the work piece can be machined.

In the accompanying drawings which illustrate a preferred embodiment of my invention, Figure 1 is a plan view of the clamping device, the parts being in operative position;

Figure 2 is a vertical longitudinal section taken on the line II—II of Figure 1;

Figure 3 is a vertical section taken on the line II—II of Figure 1, showing the parts in inoperative position;

Figure 4 is a vertical section taken on the line IV—IV of Figure 2;

Figure 5 is a vertical section taken on the line V—V of Figure 2; and

Figure 6 is a vertical section taken on the line VI—VI of Figure 2.

Referring more particularly to the accompanying drawings, my clamping device comprises a support 2 having a serrated face 3 on which the serrated face 4 of an adjustable side clamp 5 is mounted. Two hexagonal socket set screws 6 are threaded in vertical holes 7 in the side clamp and each screw extends downwardly through a slot 8 and into a slot 9 formed in the support 2. A nut 10 is threaded on the lower end of the screw and brazed to the screw to prevent it from rotating on the screw. By turning the screw 6 with a suitable tool, the nut 10 can be moved toward or away from the surface 11 of the support 2, thereby allowing adjustment of the side clamp 5 along the serrated face 3 of the support to accommodate various widths of work.

A work piece 12, the end 13 of which is to be machined, is supported on a removable filler plate 14 resting on the support 2 and by a wear plate 15 fitting between the side of the work piece and the side of the adjustable clamp 5. A stop mechanism is provided for properly locating the work piece in the clamping device. This stop mechanism comprises a rod 16 retained in a hole 17 in the clamp by screws 18. The end of the rod 16 which is farthest away from the end 13 of the work piece to be machined carries an arm 19 which may be adjusted along the rod 16 by means of a screw 20. The arm 19 carries a stop 21 which contacts the end of the work piece.

The work piece 12 is clamped in position by a tiltable top clamp 23 and a pivoted side clamp 24, both of which are actuated upon operation of a lever 25 having a ball shaped handle 26. The lower end of the lever 25 is rigidly secured by a key 27 and nut 28 to a shaft 29, which is mounted in the support 2. A cam 30 is rigidly secured to the shaft 29 by a pin 31, which has a portion 32 projecting outwardly beyond the surface of the cam. The projection 32 cooperates with a recess 33 in the top clamp 23 so as to slide the top clamp in a generally horizontal direction toward and away from the work piece when the cam is rotated.

The top clamp is provided with a slot 35 through which the stem 36 of a stud 37 extends. The stud is mounted for vertical movement in a bushing 38 mounted on the support 2. A pin 39 is mounted in the stud and extends outwardly beyond the sides of the stud so as to be in a position to contact the arms 40 of the pivoted side clamp 24. The side clamp 24 is pivoted on a pin 42 which is carried by the support 2.

The upper end of the stem 36 is provided with a washer 44 mounted loosely on the stem and with two nuts 45 and 46. A leaf spring 48 is secured at one end to the stem 36 by the nuts 45 and 46, and has its opposite end 49 pressing against the top clamp 23 so as to maintain it in contact with the cam 30. A coil spring 50 surrounds the stem 36 and is interposed between washers 51 and 52. The washer 51 presses against the lower surface 53 of the top clamp 23 and the washer 52 presses against a projecting portion 54 on each of the arms 40 of the pivoted side clamp 24. The coil spring 50 tends to urge the side clamp 24 out of contact with the work piece 12.

The operation of my clamping device is as follows:

The work piece 12 is placed in the clamping device while the parts are in the positions shown in Figure 3 and the lever 25 and cam 30 are rotated in a clockwise direction. The projection 32 of pin 31 enters the recess 33 in the top clamp 23 and causes the top clamp to be moved to the right from the position shown in Figure 3 to that shown in Figure 2 in which the jaw portion 23a of the top clamp lies over and in contact with the top surface of the work piece. Further clockwise rotation of the lever 25 and cam 30 raises the left hand end of the top clamp 23 so as to tilt the top clamp. The raising of the left hand end of the top clamp causes the stud 37 to rise and with it the pin 39 carried by the stud. The pin 39, upon contacting the arms 40 of the pivoted side clamp 24, causes the side clamp to rotate about its pivot 42 so that its jaw portion 24a contacts the side of the work piece. Further rotation of the cam 30 in a clockwise direction causes the jaw portion 23a of the top clamp 23 to more firmly engage the top surface of the work piece. The coil spring 50 is compressed while the stud 37 is being raised to engage the top clamp and side clamp with the work piece.

A unique feature of my clamping device is that any lateral pressure of the work piece against the pivoted side clamp 24 results in a downward pressure against the pin 39 and the stud 37, thereby forcing the tiltable top clamp 23 into tighter engagement with the top of the work piece. Likewise, any upward vertical pressure of the work piece against the tiltable top clamp 23 tends to raise stud 37 and pin 39, thus urging the pivoted side clamp 24 into tighter engagement with the side of the work piece.

When it is desired to release the work piece from the clamp, the lever 25 and cam 30 are rotated in a counterclockwise direction from the position shown in Figure 2 to that shown in Figure 3. As the cam 30 is rotated, it allows the left hand end of the top clamp 23 to lower under the pressure of the leaf spring 48 and the right hand end of the top clamp to release the work piece. The stud 37 lowers under the influence of the coil spring 50, thereby releasing the side clamp 24 from the work piece. The projection 32 on the pin 31 enters the recess 33 in the top clamp and slides it to the position shown in Figure 3 so that the work piece can be removed from the clamping device and a new work piece inserted in its place.

It will be seen that my clamping device is of such construction that by the operation of a single lever, the top clamp is slid into position over the work piece and in engagement with the work piece, while at the same time the side clamp also is moved into engagement with the work piece. Similarly, the operation of lever 25 in the opposite direction releases both the top clamp and side clamp from the work piece, and moves the top clamp into a position where the work piece can be removed from the clamping device and a new work piece can be inserted.

The invention is not limited to the preferred embodiment, but may be otherwise embodied or practiced within the scope of the following claims.

I claim:

1. A clamping device for holding a work piece, comprising a support, a fixed side jaw, a pivoted side clamp opposite the fixed side jaw, a tiltable top clamp, means for tilting said top clamp to engage the work piece, and means connecting said top clamp and said pivoted side clamp for moving the latter to engage the work piece whereby movement of the side clamp by the work piece from a clamped position forces the top clamp into tighter engagement with the work piece and vice versa.

2. A clamping device according to claim 1, wherein the means for tilting said top clamp includes a cam.

3. A clamping device for holding a work piece, comprising a support, a fixed side jaw, a pivoted side clamp opposite the fixed side jaw, a tiltable top clamp, a vertically movable stud, means for tilting said top clamp to engage the work piece, means connecting said top clamp and said stud for raising said stud as said top clamp is tilted to work engaging position, and means operative upon raising said stud for moving said pivoted side clamp to engage the work piece.

4. A clamping device for holding a work piece, comprising a support, a fixed side jaw, a pivoted side clamp opposite the fixed side jaw, a vertically movable stud engageable upon upward movement thereof with said pivoted side clamp to move the latter into engagement with the work piece, a top clamp having one end engageable with the top of the work piece and having an opening intermediate its ends through which said stud extends, means for raising the opposite end of said top clamp, means for limiting upward movement of said top clamp on said stud, and biasing means carried by said stud and interposed between said top clamp and said pivoted side clamp and acting to disengage the latter from the work piece.

5. A clamping device for holding a work piece, comprising a support, a fixed side jaw, a pivoted side clamp opposite the fixed side jaw, a vertically movable stud engageable upon upward movement thereof with said pivoted side clamp to move the latter into engagement with the work piece, a top clamp having one end engageable with the work piece and having a slot intermediate its ends through which said stud extends, means for limiting upward movement of said top clamp on said stud, a cam for raising the opposite end of said top clamp, and means for rotating said cam, said cam and top clamp having projection and recess engagement for moving said top clamp toward and away from the work piece as said cam is rotated.

6. A clamping device for holding a work piece, comprising a support, a fixed side jaw, a pivoted side clamp opposite the fixed side jaw, a vertically movable stud engageable upon upward movement thereof with said pivoted side clamp to move the latter into engagement with the work piece, a top clamp having one end engageable with the work piece and having a slot intermediate its ends through which said stud extends, means for limiting upward movement of said top clamp on said stud, a cam for raising the opposite end of said top clamp, and means for rotating said cam, said top clamp provided with a recess, and said cam provided with a projection for entering said recess to move said top clamp toward and away from the work piece as said cam is rotated.

7. A clamping device for holding a work piece, comprising a support, a fixed side jaw, a pivoted side clamp opposite the fixed side jaw, a vertically movable stud engageable upon upward movement thereof with said pivoted side clamp to move the latter into engagement with the work piece, a top clamp having one end engageable with the work piece and having a slot intermediate its ends through which said stud extends, means for limiting upward movement of said top clamp on said stud, a spring carried by said stud and interposed between said top clamp and said pivoted side clamp and acting to disengage the latter from the work piece, a cam for raising the end of said top clamp which is opposite the work piece, and means for rotating said cam, said cam and top clamp having projection and recess engagement for moving said top clamp toward and away from the work piece as said cam is rotated.

WILLIAM J. KEAR.

REFERENCES CITED

The following references are of record in the file of this patent:

UNITED STATES PATENTS

| Number | Name | Date |
| --- | --- | --- |
| 1,715,660 | Knight | June 4, 1929 |
| 1,729,076 | Laycock | Sept. 24, 1929 |
| 2,003,572 | Archae et al. | June 4, 1935 |